US010902562B2

United States Patent
Smit et al.

(10) Patent No.: US 10,902,562 B2
(45) Date of Patent: Jan. 26, 2021

(54) NOISE REDUCTION IN IMAGE DATA

(71) Applicant: Stichting Katholieke Universiteit, Nijmegen (NL)

(72) Inventors: Ewoud Joris Smit, Nijmegen (NL); Wolfgang Mathias Prokop, Nijmegen (NL)

(73) Assignee: Stichting Katholieke Universiteit, Nijmegen (NL)

( * ) Notice: Subject to any disclaimer, the term of this patent is extended or adjusted under 35 U.S.C. 154(b) by 87 days.

(21) Appl. No.: 16/300,091

(22) PCT Filed: May 15, 2017

(86) PCT No.: PCT/EP2017/061624
§ 371 (c)(1),
(2) Date: Nov. 9, 2018

(87) PCT Pub. No.: WO2017/194787
PCT Pub. Date: Nov. 16, 2017

(65) Prior Publication Data
US 2019/0180419 A1    Jun. 13, 2019

(30) Foreign Application Priority Data

May 13, 2016 (EP) ................................. 16169555

(51) Int. Cl.
*G06K 9/00*       (2006.01)
*G06T 5/00*       (2006.01)
(Continued)

(52) U.S. Cl.
CPC .............. *G06T 5/002* (2013.01); *G06T 5/20* (2013.01); *G06T 5/50* (2013.01); *G06T 7/20* (2013.01);
(Continued)

(58) Field of Classification Search
None
See application file for complete search history.

(56) References Cited

U.S. PATENT DOCUMENTS

| | | | | |
|---|---|---|---|---|
| 8,346,011 B2 * | 1/2013 | Kelm | ...................... | G06T 5/002 382/275 |
| 2003/0097076 A1 * | 5/2003 | Nambu | .................. | A61B 6/481 600/504 |

(Continued)

FOREIGN PATENT DOCUMENTS

WO    WO 2009081410    *    7/2009    ............... G06T 7/40

OTHER PUBLICATIONS

Adrienne M Mendrik et al,; "TIPS bilateral noise reduction in 4D CT perfusion scans produces high-quality cerebral blood flow maps", Physics in Medicine and Biology, Institute of Physics Publishing, Bristol GB, vol. 56, No. 13, Jun. 8, 2011 (Jun. 8, 2011), pp. 3857-3872, XP020206382.

(Continued)

*Primary Examiner* — Shervin K Nakhjavan
(74) *Attorney, Agent, or Firm* — N.V. Nederlandsch Octrooibureau; Catherine A. Shultz; Tamara C. Stegmann

(57) ABSTRACT

A system for filtering an input image dataset is disclosed. A plurality of sequences of input signal values, wherein each sequence corresponds to a different attribute, wherein an input signal value is associated with an attribute and a sampling point i. At least one processor 4 is configured to control computing an output signal value corresponding to a sampling point and an attribute. For a particular sampling point i and for each of a plurality of different attributes of the set of attributes, associating a weight to an input signal value based on a similarity between the signal value and for a plurality of the sampling points j excluding the sampling point i. Also the system computes a weighted sum based on
(Continued)

the input signal values and weights. The attribute is a location or a frequency.

15 Claims, 4 Drawing Sheets

(51) Int. Cl.
*G06T 5/50* (2006.01)
*G06T 5/20* (2006.01)
*G06T 7/20* (2017.01)

(52) U.S. Cl.
CPC ............ *G06T 2207/10016* (2013.01); *G06T 2207/10072* (2013.01); *G06T 2207/10076* (2013.01); *G06T 2207/10081* (2013.01); *G06T 2207/10088* (2013.01); *G06T 2207/10104* (2013.01); *G06T 2207/10108* (2013.01); *G06T 2207/20028* (2013.01); *G06T 2207/30004* (2013.01)

(56) References Cited

U.S. PATENT DOCUMENTS

| | | | | |
|---|---|---|---|---|
| 2006/0109949 | A1* | 5/2006 | Tkaczyk | A61B 6/032 378/4 |
| 2006/0198491 | A1* | 9/2006 | Taguchi | G06T 11/005 378/15 |
| 2009/0185728 | A1* | 7/2009 | Klingenbeck-Regn | G06T 7/38 382/128 |
| 2010/0290529 | A1* | 11/2010 | Topiwala | H04N 7/0125 375/240.16 |
| 2011/0243401 | A1* | 10/2011 | Zabair | G06T 7/0012 382/128 |
| 2011/0268328 | A1* | 11/2011 | Bar-Aviv | G06T 5/002 382/128 |
| 2012/0015825 | A1* | 1/2012 | Zhong | G01N 21/6428 506/6 |
| 2013/0202177 | A1* | 8/2013 | Bar-Aviv | G06T 11/008 382/131 |
| 2017/0042496 | A1* | 2/2017 | Shanbhag | A61B 5/7207 |
| 2019/0213715 | A1* | 7/2019 | Li | A61B 6/482 |
| 2019/0213741 | A1* | 7/2019 | Nagae | G06T 7/33 |

OTHER PUBLICATIONS

Li Zhoubo et al.; A robust noise reduction technique for time resolved CT, Medical Physics, AIP, Melville, NY, US, vol. 43, No. 1, Dec. 29, 2015 (Dec. 29, 2015), pp. 347-359, XP012204152.

Huhle B et al.; "Robust non-local denoising of colored depth data", Computer Vision and Pattern Recognition Workshops, 2008. CVPR Workshops 2008. IEEE Computer Society Conference on, IEEE, Piscataway, NJ, USA, Jun. 23, 2008 (Jun. 23, 2008), pp. 1-7, XP031285714.

Fan Zhu; "Brain Perfusion Imaging-Performance and Accuracy", Jul. 2, 2013 (Jul. 2, 2013), pp. 1-154, XP055326404.

Michael Manhart: "Dynamic Interventional Perfusion Imaging: Reconstruction Algorithms and Clinical Evaluation Dynamische interventionelle Perfusionsbildgebung: Rekonstruktionsalgorithmen und klinische Evaluation", Nov. 13, 2014 (Nov. 13, 2014), pp. 1-120, XP055326407.

* cited by examiner

NOISE REDUCTION IN IMAGE DATA

FIELD OF THE INVENTION

The invention relates to filtering an input image dataset. The invention further relates to noise reduction, in particular noise reduction in image data, such as medical image data.

BACKGROUND OF THE INVENTION

Since x-ray radiation increases the risk of inducing cancer, x-ray computed tomography (CT) scanning is limited by a trade-off between image quality and the amount of radiation exposure to the patient. In general, the radiation dose should be kept as low as reasonably achievable (ALARA). This is especially important for 4D CT perfusion (CTP) scans, which consist of multiple sequential 3D CT scans over time after injection of contrast material. The amount of radiation dose that can be used per sequential scan is therefore limited, which results in a high level of noise.

Cerebral computed tomography perfusion (CTP) scans are acquired to detect areas of abnormal perfusion in patients with cerebrovascular diseases, such as acute stroke, subarachnoid hemorrhage or carotid occlusive disease. These 4D CTP scans consist of multiple sequential 3D CT scans over time. Therefore, to reduce radiation exposure to the patient, the amount of x-ray radiation that can be used per sequential scan is limited, which results in a high level of noise. To detect areas of abnormal perfusion, perfusion parameters are derived from the CTP data, such as the cerebral blood volume (CBV), mean transit time (MTT) and cerebral blood flow (CBF). Algorithms to determine perfusion parameters, especially singular value decomposition, are very sensitive to noise. To obtain more robust results, a global noise threshold is used for standard singular value decomposition (SVD) and block-circulant SVD uses an oscillation index. However, even when the oscillation index is used, the quality of the CBF maps decreases drastically with increasing noise level. Therefore, noise reduction is an important preprocessing step for CTP analysis. In 4D perfusion data, different tissue types are characterized by differences in the time-intensity profiles (fourth dimension). For instance, healthy tissue has a different time-intensity profile, contrast uptake and wash out than an area at risk for infarction, and the time-intensity profiles of white matter are different from those of gray matter. One of the goals of noise reduction in perfusion data is therefore to reduce noise while preserving the time-intensity profiles that are important for determining the perfusion parameters.

The paper "TIPS bilateral noise reduction in 4D CT perfusion scans produces high-quality cerebral blood flow maps", which appeared in Phys. Med. Biol. 56 (2011) 3857-3872, doi:10.1088/0031-9155/56/13/008, discloses a time-intensity profile similarity (TIPS) bilateral filter to reduce noise in 4D CTP scans, while preserving the time-intensity profiles (fourth dimension) that are used for determining the perfusion parameters.

Each pixel value in the image is replaced with a weighted average of similar and nearby pixel values. The Gaussian closeness function x) is defined as $$c(\xi, x) = \exp\left(-\frac{1}{2}\left(\frac{d(\xi, x)}{\sigma_d}\right)^2\right). \quad \text{(Equation 1)}$$

A 3D weighted averaging kernel is used, in which the weights are based on the 3D Euclidean distance and the similarity of the fourth dimension. The TIPS function (p(ξ, x)) is defined as $$p(\xi, x) = \exp\left(-\frac{1}{2}\left(\frac{\zeta(\xi, x)}{\sigma_\zeta}\right)^2\right) \quad \text{(Equation 2)}$$

where ζ(ξ, x) is the sum of squared differences (SSD) measure between the time-intensity profile at voxel x and a neighboring voxel ξ. The variable σζ is a filter parameter that affects the filter strength by determining the slope of the similarity function p. The SSD measure is defined as $$\zeta(\xi, x) = \frac{1}{T}\sum_{t=0}^{T-1}(I(\xi(x, y, z, t)) - I(x(x, y, z, t)))^2$$

where T is the size of the temporal dimension, I(x(x, y, z, t)) is the intensity value of voxel x(x, y, z) at time point t and I(ξ(x, y, z, t)) is the intensity value of a neighboring voxel ξ(x, y, z) at time point t.

For each voxel x in the 4D dataset, the bilateral filtering equation is defined as follows:

$$h(x(x, y, z, t)) = \frac{1}{n(x)}\sum_{i=-m}^{m}\sum_{j=-n}^{n}\sum_{k=-o}^{o} I(\xi(x+i, y+j, z+k, t))c(\xi, x)p(\xi, x)d\xi$$

wherein m, n and o are the half kernel sizes in the x, y and z directions, respectively, c(ξ, x) is the closeness function as defined by Equation 1, p(ξ, x) is the TIPS function as defined by Equation 2, and n(x) is the normalization factor defined as $$n(x) = \sum_{i=-m}^{m}\sum_{j=-n}^{n}\sum_{k=-o}^{o} c(\xi, x)p(\xi, x)d\xi.$$

The TIPS filter works well under certain conditions, given optimally chosen filter parameters $\sigma_d$, $\sigma_\zeta$ and the half kernel size m, n, and o. However, there is an intrinsic limitation caused by the similarity measure p that favors those time-intensity profiles of neighboring voxel ξ that are most similar to the time-intensity profile of voxel x. As a result, the time-intensity profile after TIPS filtering may remain too similar to the original profile of voxel x, which will cause suboptimum noise reduction. In addition, there is a spatial constraint for finding similar profiles given by the half kernel sizes m, n, and o. In case there are not enough voxels with similar time-intensity profiles within the filter kernel, too few profiles will be used for filtering to create an effective noise suppression.

SUMMARY OF THE INVENTION

It would be advantageous to have an improved filter for filtering a dataset comprising measurement data.

According to an aspect of the present disclosure, a system for filtering an input image dataset is provided. The system is configured to process an input dataset comprising a plurality of sequences of input signal values corresponding to sampling points i, wherein each sequence corresponds to a different attribute x of a set of attributes, wherein an input signal value I(x,i) is associated with an attribute x and a sampling point i. The system comprises at least one processor configured to control computing an output signal value I*(x,i) corresponding to a sampling point i and an attribute x, wherein the computing comprises for a particular sampling point i and for each of a plurality of M different attributes $y_k$ (=$y_1, \ldots, y_M$) of the set of attributes, associating a weight w(x,$y_k$,i) to an input signal value I($y_k$,i) based on a similarity $S_i$(x,$y_k$) between the signal values I(x,j) and I($y_k$,j) for a plurality of the sampling points j excluding the sampling point i, and computing a weighted sum based on the input signal values I($y_k$,i) and weights w(x,$y_k$,i), for $y_k$ (=$y_1, \ldots, y_M$).

Input signal values I(x,i) contain random errors due to noise. Because of the weighted sum, random noise in the output signal values is reduced compared to the input signal values. Features in the sequence of input signals however, are preserved in the output signal values and not lost in the weighted averaging step, because the weights that are associated with each attribute $y_k$ are based on the similarity between the sequence of signal values of $y_k$ and the sequence of signal values of attribute x. A larger weight is assigned for a higher similarity between the sequences of input signal values of $y_k$ and x. By excluding the filtered sampling point i from the calculation of the similarity measure, the random noise at sampling point i does not influence the output signal. The noise at sampling point i is therefore decoupled from the noise at all other sampling points. This makes the filter much less vulnerable to noise at sampling point i.

The attribute may be a location or a frequency. A location can be a volumetric region such as a voxel, or a two-dimensional region such as a pixel, for example. A frequency can be a frequency or a range of frequencies, for example when the signal values are expressed in a frequency domain.

The weight w(x,$y_k$,i) may be independent of a difference between the attribute x and the attribute $y_k$. By choosing the weight independent of the difference between these attributes, more input signal values can be used to contribute to the computation of the output signal value I*(x,i). This way, attributes with similar input signal values I(y,i) can be identified, which gives rise to improved filter results. For example, similar tissue types can result in similar signal values, regardless of the distance between the voxels where the tissue types are present. Signal values of the same tissue type can be averaged to reduce the noise without losing information about the tissues represented in the dataset. Also, the similarity measure $S_i$(x,$y_k$) may be independent on a difference between the attributes x and $y_k$.

For example, when the attribute is a location, the weight w(x,$y_k$,i) can be determined independently of a distance between the location x and the location $y_k$. Also, the similarity measure $S_i$(x,$y_k$) may be independent on a difference between the locations x and $y_k$.

The processor may be configured to select the plurality of different attributes $y_k$, for k=1, . . . , M, among attributes y of the set of attributes for which the similarity $S_i$(x,y) satisfies a predetermined constraint. This way, by making a selection, the system can compute the filter results more computationally efficiently. By selecting the attributes y using the similarity $S_i$(x,y), the filter result is still good.

The processor may be configured to select the plurality of different attributes $y_k$ as a random selection of the attributes y for which the similarity $S_i$(x,y) satisfies the predetermined constraint. A random selection has given good results in the experiments.

In certain implementations, the predetermined constraint does not impose a constraint on the difference between the attribute x and the attribute $y_k$. This way the selection of the attributes that are used in the weighted average is not limited by the difference between the attributes. For example, when the attribute represents a location, the difference can be the distance. This distance does not have to play a role in the selection of voxels.

The sampling points i may correspond to time points. Thus, the sequence of input signal values associated with an attribute x may represent a time signal.

The sampling points i may represent a sequence of measurements. For example, a sequence of measurements can be performed to capture a movement or a change in time. This can be applied, for example, in perfusion studies.

The locations may represent voxel locations within a volume dataset or pixel locations within a picture dataset.

The locations may represent positions on a detector mounted on a gantry and gantry positions. The signal values may thus be the sensor values of the sensors on the gantry, before any tomographic reconstruction is performed.

The processor may be configured to perform motion compensation on the input dataset, and to compute the output signal values based on motion compensated input signal values. This way, the sequence of input signal values more accurately corresponds to a fixed location, which improves the filter result.

The input signal values may comprise at least one of: computed tomography (CT) data, computed tomography perfusion (CTP) data, magnetic resonance imaging (MRI) data, single photon emission computed tomography (SPECT) data, and positron emission tomography (PET) data.

The system may comprise a display configured to display an image based on the output dataset. This allows to view an image in which much noise has been removed.

The system may comprise a medical imaging apparatus comprising at least one sensor to generate the input dataset.

According to another aspect of the invention, a method of filtering an input image dataset is provided. The input dataset comprises a plurality of sequences of input signal values corresponding to sampling points i, wherein each sequence corresponds to a different attribute x of a set of attributes, wherein an input signal value I(x,i) is associated with an attribute x and a sampling point i. The method comprises computing an output signal value I*(x,i) corresponding to a sampling point i and an attribute x, wherein the computing comprises for a particular sampling point i and for each of a plurality of M different attributes $y_k$ (=$y_1, \ldots, y_M$) of the set of attributes, associating a weight w(x,$y_k$,i) to an input signal value I($y_k$,i) based on a similarity $S_i$(x,$y_k$) between the signal values I(x,j) and I($y_k$,j) for a plurality of the sampling points j excluding the sampling point i, and computing a weighted sum based on the input signal values I($y_k$,i) and weights w(x,$y_k$,i), for $y_k$ (=$y_1, \ldots, y_M$).

The method may be implemented in form of a computer program product comprising instructions for causing a processor system to perform the steps of the method set forth.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale.

DETAILED DESCRIPTION OF EMBODIMENTS

In the following detailed description, features of the invention will be described in more detail. The details disclosed herein are intended as an aid for the skilled person to understand the present disclosure. However, the detailed examples are not intended to limit the scope of the present disclosure. Instead, many modifications and variants of the present disclosure may become apparent to the person skilled in the art, which variations and modifications are within the spirit and scope of the present invention, as defined by the appended claims and their equivalents.

According to an aspect of the present disclosure, an improved similarity filter is provided. According to a further aspect of the invention, a similarity filter is provided that employs a similarity measure to compare the time-dependent behavior of a voxel to the time dependent behavior of another voxel in order to determine a similarity between the two voxels.

According to a further aspect of the present disclosure, a time-intensity profile similarity (TIPS) filter is provided to reduce noise in 4D computed tomography perfusion (CTP) scans, while preserving the time-intensity profiles (the fourth dimension) for determining the perfusion parameters.

According to a further aspect of the present disclosure, a method is provided to reduce random noise in (temporally) variable (n-dimensional) pixelized data that is sampled multiple times.

According to a further aspect, a filter for noise reduction is disclosed, which is more effective in reducing noise for each measurement by using not only the current (or a few neighboring) measurements to estimate a voxel value, but—if desired—(almost) the complete set of measurements for noise reduction.

According to a further aspect, a filter is based on similarity between voxels in terms of properties at each sampling point. Herein, each sampling point may represent a moment in time or a frequency, for example.

According to a further aspect, similarity between voxels may be determined locally (around the voxel to be filtered) but also globally (by comparing the voxel to be filtered with any voxel in the dataset).

According to a further aspect, use is made of the assumption that if measured data are similar for all sampling points except a certain sampling point i, then it is likely that the voxels hold similar properties, and therefore have similar behavior also for the sampling point i.

Figure 1:
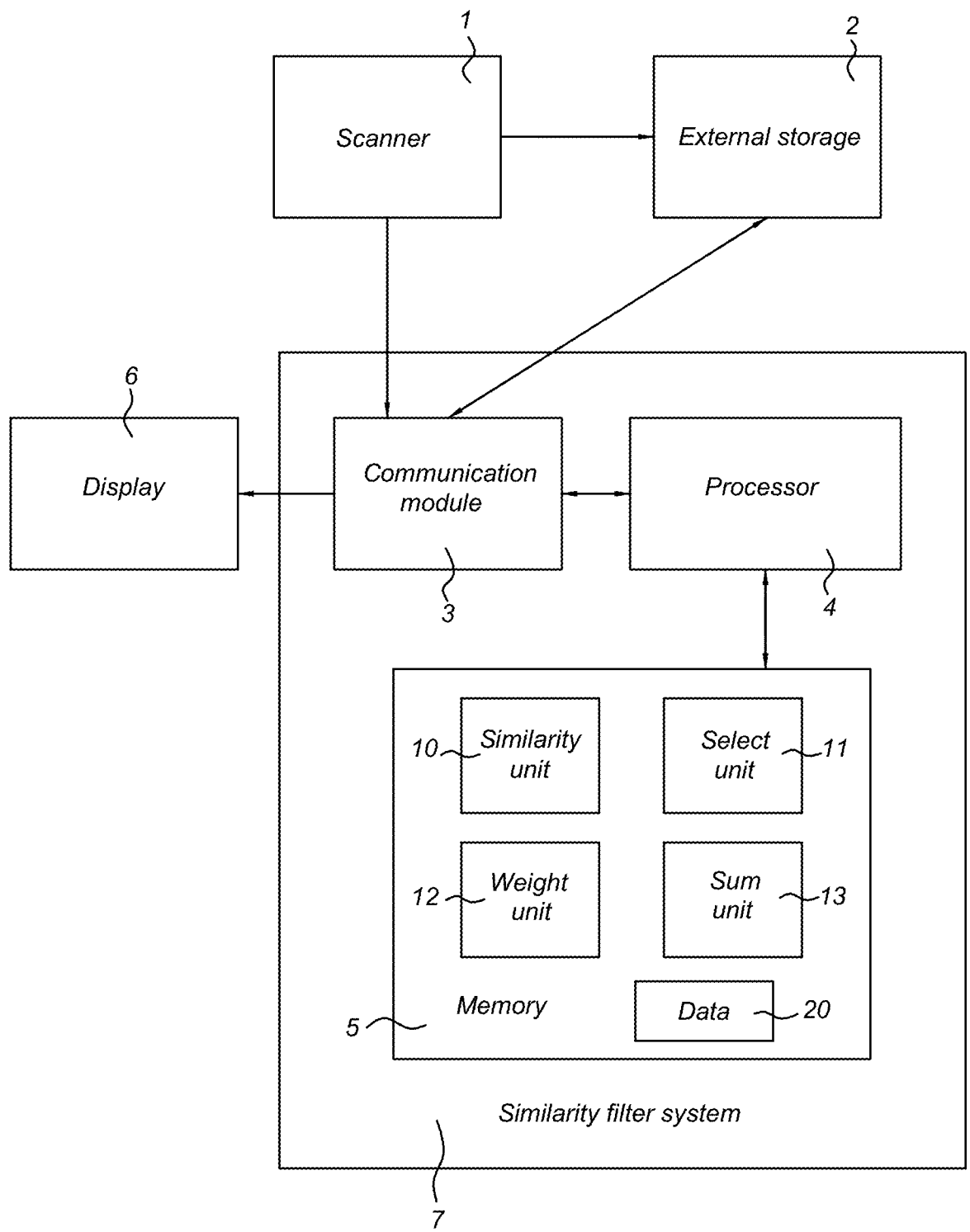
FIG. 1 shows an imaging system including a system for filtering an input image dataset.

FIG. 1 illustrates an imaging system. The imaging system comprises a scanner 1. The scanner can be a medical imaging scanner or another type of scanner. In certain implementations, the scanner produces a plurality of measurements, which measurements form an input signal value for the similarity filter system 7. Such an input signal value may be, associated with an attribute. For example, a plurality of sensors are provided and the attribute can comprise an index of the sensor that generated the measurement that resulted in the input signal value. Alternatively or additionally, the attribute can comprise a parameter of the measurement performed to generate the input signal value, such as a gantry rotation angle or an applied gradient or a frequency. In certain embodiments, measurements of different sensors are combined to form a two-dimensional or a three-dimensional dataset. The pixels or voxels of such datasets can form the input signal values, and the attributes can comprise a representation of the location corresponding to each voxel. Also, for each of the attributes, a sequence of input signal values may be generated. This sequence of measurements may be referred to as sampling points herein. The sequence may be a temporal sequence, e.g. a series of measurements made in succession, to capture changes over time. Alternatively, the sequence may capture a variation of a feature based on another parameter, for example the sampling points may correspond to different frequencies in a measured spectrum. In certain embodiments, the scanner 1 comprises a computed tomography scanner or an MM scanner. Other types of scanners, such as PET and SPECT scanners can also be used in certain embodiments. For example, perfusion may be captured by acquiring a number of volumetric datasets in succession during an in-flow of a contrast agent into a subject. The sampling points may then correspond to the successive volumetric datasets.

The dataset created with the imaging system may contain noise. Such noise can be caused by measurement errors. These measurement errors can be random deviations of the measured value from the underlying "true" value of the property that is measured. Over a plurality of measurements in the dataset, the average noise may be zero. Such noise can be distinguished from, for example, a bias, which is a systematic deviation of measurement values from the "true" value.

The imaging system can also comprise an external storage system 2, such as a hospital information system or a plain file server. Input signal values and output signal values can be stored on and retrieved from the external storage system 2.

The imaging system can also comprise a display device 6, for displaying filtered and/or unfiltered signal values. This display can be in the form of a graphical representation of the signal values.

The similarity filter system 7 may comprise a communication module 3, which is configured to receive input signal values from the scanner 2 or from the external storage system 2 or from another source. Also, the communication module 3 may be configured to export and store the output signal values in the external storage device 2 or send the output signal values to another suitable device.

The similarity filter system 7 may further comprise a memory 5, which may be configured to store data 20 such as input signal values, output signal values, and intermediate results of computations. Also, the memory 7 may be configured to store configurable parameters of the filter system 7. In certain embodiments, the memory 7 is configured to store a computer program 10-13 with instructions for causing the processor 4 to perform a method of filtering the input signal values, as set forth in the present disclosure. The processor 4 may be any suitable computer processor, such as a microprocessor, a controller, or an FPGA. Alternatively, dedicated electronic circuitry may be provided to implement the filter operations.

The computer program may be divided into functional units. In the present disclosure an example division of a computer program into units is presented, but this is only an example. Other implementations can comprise different division of functionality into units.

The communication module 3 may be configured to receive the input dataset from the scanner 1 or external storage 2. The input dataset may comprise a plurality of sequences of input signal values corresponding to sampling points i, wherein each sequence corresponds to a different attribute x of a set of attributes, wherein an input signal value I(x,i) is associated with an attribute x and a sampling point i.

The filter system 7 may comprise a similarity unit 10 configured to compute a similarity $S_i(x,y_k)$ between the signal values I(x,j) and $I(y_k,j)$ for a plurality of the sampling points j excluding the sampling point i. That is, an overall similarity measure between the sequence of input signal values associated with a first attribute x and the sequence of input signal values associated with a second attribute $y_k$ is determined. Herein, the sampling point i of both sequences is disregarded. That is, the sequences are indexed so that a sampling point i of attribute x corresponds to a sampling point i of attribute $y_k$. The similarity $S_i(x,y_k)$ is computed for a plurality of different second attributes $y_k$, k=1, ..., K. This way, attributes of which the input signal values are similar to the input signal values of the first attribute x may be identified. In certain embodiments, the similarity unit 10 is configured to perform its operation for each attribute x for which an output signal value is desired. Also, the similarity unit 10 may be configured to perform its operation repeatedly for the same attribute x, each time excluding a different sampling point i from the similarity assessment $S_i(x,y_k)$.

The similarity filter system 7 may further comprise a select unit 11. The select unit 11 selects a plurality of the second attributes $y_k$, based on the similarity measure $S_i(x,y_k)$. The number of selected attributes is denoted herein as M. Herein, M<=K. The selection may be performed in many different ways, but in any case M attributes $y_k$ are selected of which the similarity measure $S_i(x,y_k)$ indicates a high degree of similarity. For example, if M is a predetermined number, the M attributes $y_k$ having the largest similarity $S_i(x,y_k)$ with the attribute x may be selected. Alternatively, a minimum threshold may be set on the similarity, and M attributes may be selected among the second attributes for which the similarity $S_i(x,y_k)$ has a value above the threshold. Such selection may be a random selection. Alternatively, eligible attributes may be selected that are closest to the attribute x. For example, if x is a location, M locations $y_k$ may be selected that are closest to the location x. Alternative selection possibilities are described elsewhere herein. In the following, for convenience, the second attributes are renumbered such that the selected second attributes are denoted as $y_k=y_1, \ldots, y_M$. In certain embodiments, the select unit 11 is configured to perform its operation for each first attribute x for which an output signal value is desired. Also, the select unit 11 may be configured to perform its operation for each sampling point i for which the similarity $S_i(x,y_k)$ was computed.

The similarity filter system 7 may further comprise a weight unit 12 for associating a weight to each of the selected second attributes $y_k=y_1, \ldots, y_M$ of a particular first attribute x. As noted above, one of the sampling points i was not taken into account in the computation of the similarity $S_i(x,y_k)$ and/or for the selection of the M second attributes. The weight unit associates a weight value $w(x,y_k,i)$ to a combination of the first attribute x, the second attribute $y_k$, and the excluded sampling point i. In certain embodiments, the weight is a function of the similarity value $S_i(x,y_k)$. In certain embodiments, a difference between the two attributes x and $y_k$ is not taken into account in the computation of the weight value $w(x,y_k,i)$. In general, a greater weight $w(x,y_k,i)$ is associated to combinations of which the similarity $S_i(x,y_k)$ is large. The weight unit 12 may be configured to repeat its operations for the different first attributes x, the corresponding second attributes $y_k$, k=1, ..., M, and the different excluded sampling points i.

The similarity filter system 7 may further comprise a sum unit 13. The sum unit 13 is configured to compute a weighted sum of a plurality of the input signal values, using the selection of second attributes made by the select unit and the weights determined by the weight unit. That is, the sum unit computes a weighted sum of the input signal values $I(y_k,i)$ for each of the selected attributes $y_k=y_1, \ldots, y_M$. The input signal values corresponding to the sampling point i, which was excluded in the determination of the similarity function $S_i(x,y_k)$ and in the selection of the second attributes $y_k$, are added to form the weighted sum. For example, the weighted sum may be computed as:

$$I^*(x,i) = \Sigma_{k=1}^M w(x,y_k,i) \cdot I(y_k,i).$$

Herein, the operator can denote multiplication, for example. The sum unit 13 may be configured to repeat its operations for the different first attributes x, the corresponding selected second attributes $y_k$, k=1, ..., M, and the different sampling points i.

The output signal values, which may be output by the communication module 3 or alternatively stored as data 20 in memory 5, are based on this weighted sum. In certain embodiments, the output signal values are the output $I^*(x,i)$ of the sum unit 13. Alternatively, one or more post-processing steps may be performed, so that the output signal values are based on the weighted sums $I^*(x,i)$.

As noted before, the attribute can be a location or a frequency. However, this is not a limitation. The attribute can, in principle, be any labeling of the sequences of input signal values.

In certain embodiments, weight $w(x,y_k,i)$ is independent of a difference between the attribute x and the attribute $y_k$. The weight is thus determined based on the similarity of the sequences of input signal values of the attribute x and of the attribute $y_k$, excluding the sampling point i. Likewise, in the case that the attribute is a location, the weight $w(x,y_k,i)$ may be independent of a distance between the location x and the location $y_k$. However, in certain embodiments the this difference may also be taken into account, for example giving a greater weight to attributes $y_k$ where the difference with attribute x is smaller.

The processor may be configured to select the plurality of different attributes $y_k$, for k=1, ..., M, among attributes y of the set of available attributes for which the similarity $S_i(x,y)$ satisfies a predetermined constraint, such as the constraint that the similarity is above a given threshold, or that the similarity is among the M highest ranking similarities. The processor may be configured to select the plurality of different attributes $y_k$ as a random selection of the attributes y for which the similarity $S_i(x,y)$ satisfies the predetermined constraint. In certain embodiments, the predetermined constraint does not impose a constraint on the difference between the attribute x and the attribute $y_k$. The sampling points i may correspond to time points when measurements were made, or the sampling point i may represent an index of a sequence of measurements.

An example of a situation where the attribute comprises a location is the situation that the input signal values represent a spatial dataset, wherein the locations represent voxel locations within a volume dataset or pixel locations within a two-dimensional picture dataset. Alternatively, the locations may represent positions on a detector mounted on a gantry and gantry positions. That is, the sensor position on the gantry, as well as the gantry position, together determine the "location". Herein, the "gantry position" may comprise a rotation angle of the gantry.

In certain embodiments, the processor is configured to perform motion compensation on the input dataset, and to compute the output signal values based on motion compensated input signal values. This way the similarity of the sequences of input signal values over time is better assessed, and the filter can perform better.

The input signal values can, for example, comprise computed tomography (CT) data, computed tomography perfusion (CTP) data, magnetic resonance imaging (MM) data, single photon emission computed tomography (SPECT) data, and/or positron emission tomography (PET) data.

Figure 2:
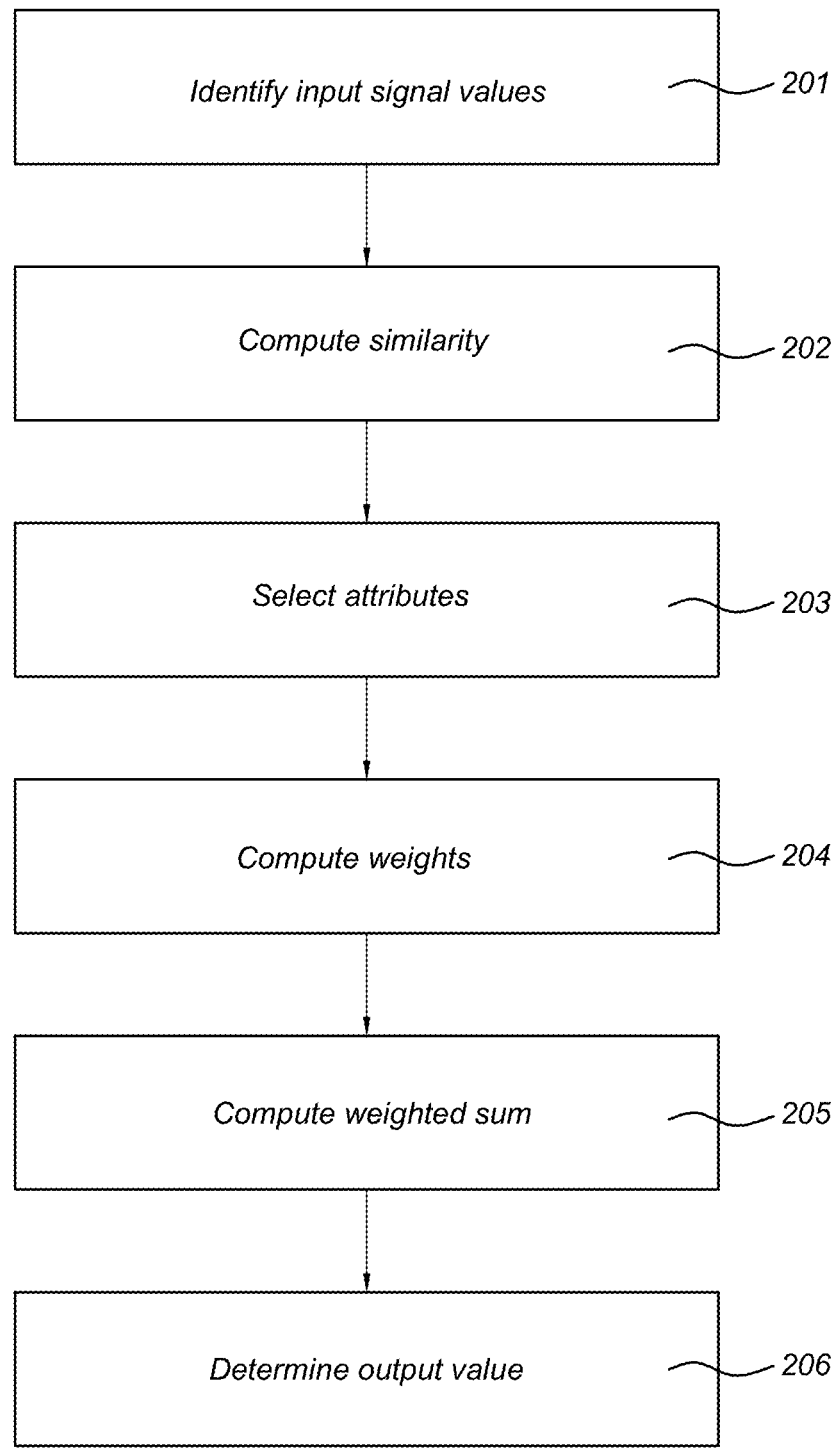
FIG. 2 shows a method of filtering an input image dataset.

FIG. 2 shows a flowchart of a method of filtering an input image dataset. In step 201, an input dataset is identified. For example, the input datatset is received from another device such as a scanner device. Herein, the input dataset comprises a plurality of sequences of input signal values corresponding to sampling points i, wherein each sequence corresponds to a different attribute x of a set of attributes, wherein an input signal value I(x,i) is associated with an attribute x and a sampling point i.

In step 202, the similarity $S_i(x,y)$ is determined between the sequences of input signal values of pairs of attributes x and y. Herein, each time at least one sampling point i is excluded from the similarity determination. This similarity is computed for many different attributes x and y and sampling points i.

In step 203, for a given first attribute x and a sampling point i, a set of second attributes $y_k$ is selected, which have a relatively large similarity $S_i(x,y_k)$. Criteria for selecting these attributes $y_k$ have been described elsewhere in this disclosure. This selection may be made for each first attribute x and for each sampling point i, for which an output signal value is desired.

In step 204, in respect of each first attribute x and sampling point i for which an output signal value is desired, weights $w(x,y_k,i)$ are associated with the second attributes $y_k$. The weights are based on the similarities $S_i(x,y)$.

In step 205, in respect of each first attribute x and sampling point is for which an output signal value is desired, the weighted sum of the sampling point i of the selected second attributes $y_k$ is computed, using the weights $w(x,y_k, i)$. In certain embodiments, the weighted sum is a weighted average.

In step 206, the output signal values $I^*(x,i)$ corresponding to a sampling point i and an attribute x are determined. These output signal values are based on the weighted sums.

Figure 3:
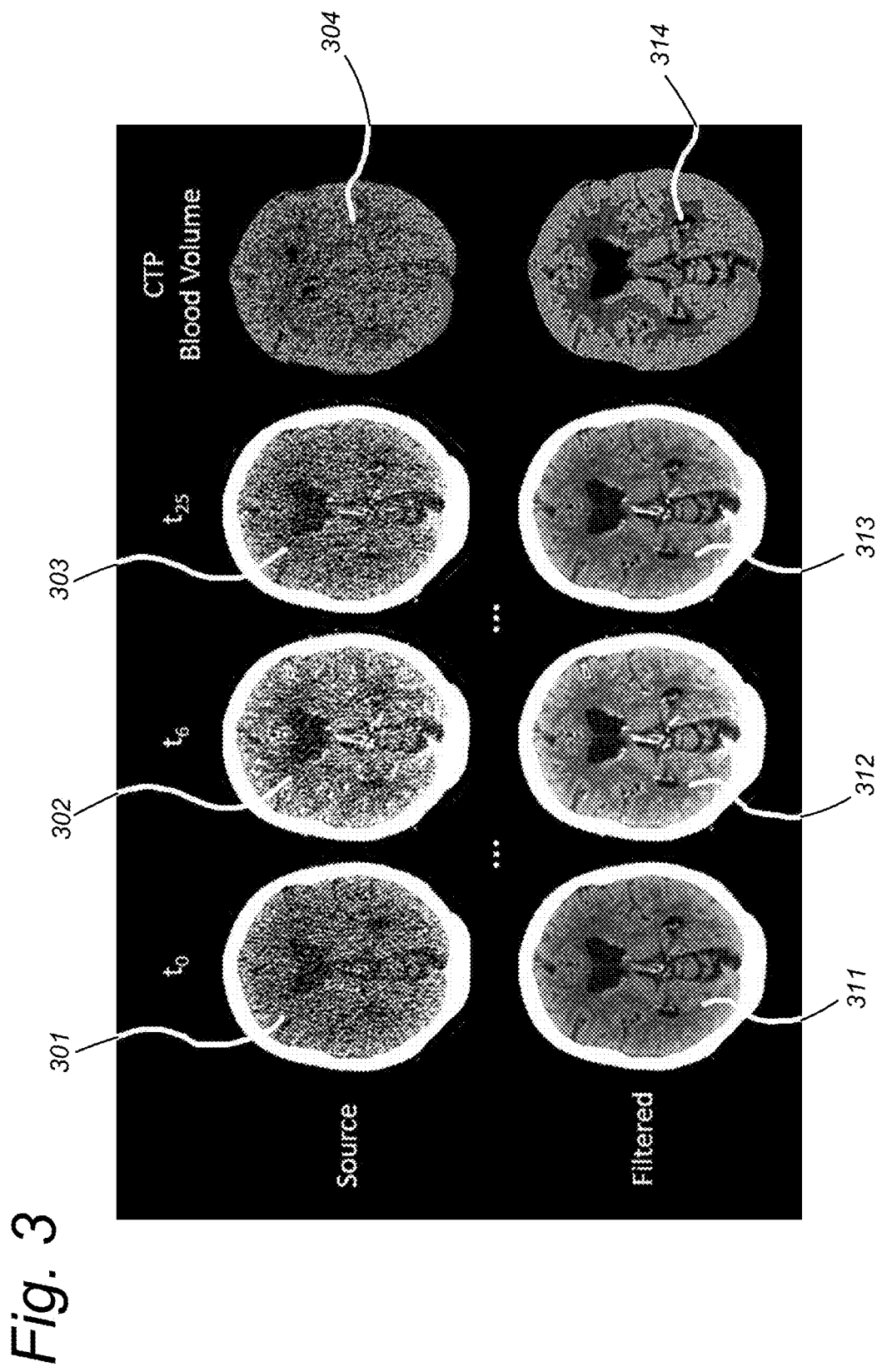
FIG. 3 illustrates an example application of the similarity filter in dynamic CT imaging of the brain.

FIG. 3 shows an example of the similarity filter when applied to dynamic Computed Tomography (CT) imaging of the brain. In dynamic CT multiple scans are performed over time. As illustrated, slices 301 and 311 correspond to a scan at time point to, slices 302 and 312 correspond to a scan at time point $t_6$, and slices 303 and 313 correspond to a scan at time point $t_{25}$. Only a few of the slices acquired at different time points t of a dynamic CT measurement are shown in the drawing. From these scans, perfusion maps can be calculated, such as the cerebral blood volume shown in perfusion maps 304 and 314. The top row of FIG. 3 shows the data as it is obtained from the scanner (i.e. unfiltered slices 301, 302, 303) and the perfusion map 304 computed from the unfiltered slices 301, 302, 303. In these unfiltered images, anatomical structures are hardly visible. The bottom row of FIG. 3 shows the results after similarity filtering, i.e. filtered slices 311, 312, 313 and the perfusion map 314 computed from the filtered slices 311, 312, 313. In these filtered images, anatomical structures are visible at a very high level of detail.

Figure 4:
FIG. 4 illustrates an example application of the similarity filter in dynamic PET imaging of the chest.

FIG. 4 shows an example of the similarity filter when applied to dynamic Positron Emission Tomography (PET) imaging of the chest. The left image 401 shows the arterial phase of the dynamic series as obtained from the scanner in which anatomical structure and a tumor in the right lung (left side of the image) are hardly visible. The right image 402 shows the result after similarity filtering in which the lungs including the tumor in the right lung are clearly visible and sharply marginated.

An example implementation of the algorithm used in filtering the dataset can be described as follows.

First, a dataset is provided having a vast number of voxels. Each voxel represents an element of an n-dimensional space. A feature of each voxel is measured a plurality of times, for example m times, wherein m is an integer number greater than one. The measured feature can be a signal, for example a physical property of a substance at the voxel such as a CT number or a relaxation time. Such a physical property can change over time, for example due to changes of the substance at the voxel. This is for example the case when a contrast agent flows through the voxel during the measurements. However, other kinds of voxel data can also be processed using the methods of the present disclosure. In an alternative embodiment, the data of each voxel can comprise a vector representing a frequency spectrum, wherein each component of the vector represents a different frequency.

If the data is noisy, the measured values at a certain sampling point i may vary substantially between voxels that show a similar behavior at the other sampling points. By averaging the corresponding sampling point i of a sufficiently large number of such similarly behaving voxels, an improved estimate of true voxel intensity of these voxels at sampling point i can be found.

Finding similarly behaving voxels can be done by defining a distance measure between the feature vector of the voxel to be filtered and feature vectors of the other voxels in the data set. Herein, a feature vector is a vector containing the sampling points of a particular voxel.

The filter disclosed herein may be particularly useful for data that is spatially consistent in that the sequence of sampling points for a particular attribute or location all describe the same physical entity (e.g., the same portion of a tissue). When this is not the case, a preprocessing technique, known in the art by itself, such as motion compensation, can be applied to create a dataset that is consistent. Also, the filter is particularly effective when the noise in the dataset is not correlated, so that the noise cancels out when summing or averaging the data of various sampling points and attributes (or locations). Also, preferably there are a large number of attributes (e.g., many voxels), having a similar behavior. For best performance, image noise per sampling point should be similar. This may be achieved using a normalization step, which is known in the art per se.

It is noted that these preferred situations are not limitations of the disclosed filter. Rather, it is meant to indicate a few application domains where the filter may be particularly effective. In other situations the filter may also provide satisfactory results.

In the following description, it is assumed that the dataset has similar noise for each sampling point (e.g. for each time point). To achieve this, an optional normalization step may be performed. Alternatively, the amount of noise in each sampling point can be taken into account in the distance measure and/or in the other computational steps.

The following table lists the symbols that are used in the remainder of this disclosure.

TABLE 1

| Symbol | Meaning |
| --- | --- |
| x, y | voxel locations within the dataset |
| n | total number of sampling points for each voxel location within the dataset |
| I(x, i) | input signal of a voxel at location x and sampling point i |
| I*(x, i) | output signal of a voxel at location x and sampling point i |
| $I_i(x)$ | signal vector at location x excluding sampling point i: $I_i(x) = (I(x, 1), \ldots, I(x, i-1), I(x, i+1), \ldots, I(x, n))$ |
| $\|I_i(x), I_i(y)\|$ | a measure of a distance between signal vectors $I_i(x)$ and $I_i(y)$ |
| $S_i(x, y)$ | a similarity between signals at locations x and y: $S_i(x, y) = f(\|I_i(x), I_i(y)\|)$, for a given function f |
| f(d) | a weight function that is highest for d = 0 and approaches 0 for larger d |

In some embodiments, the weight function f may be dependent on the number of eligible voxels, and may be asymmetrical.

The output signal I*(x, i) may be computed as a weighted average of the input signals $I(y_j, i)$ of M voxels $y_j$ at the corresponding sampling point i, wherein j=1, . . . , M. To select these M voxels $y_j$, voxels may be chosen for which the distance $\|I_i(x), I_i(y_j)\|$ satisfies a particular constrains. In particular, voxels may be chosen for which this distance is relatively small. In certain embodiments, the weighted average may be computed based on the following equation:

$$I^*(x, i) = \sum_{j=1}^{M} f(\|I_i(x), I_i(y_j)\|) I(y_j, i) \bigg/ \sum_{j=1}^{M} f(\|I_i(x), I_i(y_j)\|).$$

Herein, $y_j$, for each j=1, . . . , M, is one of the M voxels that fulfill a certain similarity condition. Examples of methods to select these M voxels include the following:

- the M voxels for which $\|I_i(x), I_i(y_j)\|$ is smallest;
- a random selection of M voxels for which $\|I_i(x), I_i(y_j)\| < k$, wherein k is a predetermined threshold;
- a random selection of M voxels for which $f(\|I_i(x), I_i(y_j)\|) > k$, wherein k is a predetermined threshold;
- a random selection of M voxels for which $\|I_i(x), I_i(y_j)\|$ has a predefined distribution (e.g., a Gaussian distribution).

The $y_j$ may be searched in the whole n-dimensional data set or a local subset around the voxel x.

The distance function $\|I_i(x), I_i(y)\|$ can be any suitable distance function. A first example of a suitable distance function is the following:

$$\|I_i(x), I_i(y)\| = \sum_{j=1; j \neq i}^{n} [I_j(y) - I_j(x)]^2$$

This distance function is the sum of squares of the differences of the components of the vectors x and y. Alternatively, it is also possible to use the root of this sum of squares as the distance measure. In another example, the noise $\sigma_i$ of the measurements is taken into account:

$$\|I_i(x), I_i(y)\| = \sum_{j=1; j \neq i}^{n} [I_j(y) - I_j(x)]^2 / \sigma_j^2$$

This distance is the weighted sum of squares of the differences of the components, weighted according to the noise for different i. Alternatively, the root of this distance measure can be used. Another alternative is the sum of the absolute difference of each component of the vectors x and y:

$$\|I_i(x), I_i(y)\| = \sum_{j=1; j \neq i}^{n} |I_j(y) - I_j(x)| / \sigma_j$$

In this alternative, the weighting according to the noise level o is again optional. Moreover, other known distance measures may be used to replace the above examples.

In the above equations, a weighting function f was used to weight the measurement values when computing the weighted average of sampling point i of the selected voxels. In the following a few examples will be given of useful weighting functions f. However, other weighting functions may be used instead.

In a first example, no weighting is performed:

$f(d)=d$, for all $d$

In a second example, homogeneous weighing within kernel c is performed:

$f(d)=1$, for $d \leq c$ $f(d)=0$, for $d > c$

In a third example, triangular weighing within a kernel c is performed, wherein c is a number greater than 0:

$f(d)=1-d/c$, for $d \leq c$ $f(d)=0$, for $d > c$

In a fourth example, exponential weighing is performed, using a parameter c greater than 0:

$f(d)=\exp[-½(d/c)2]$, for all $d$.

A practical example application of the method is computed tomography perfusion (CTP) imaging. CTP comprises acquisition of a plurality of CT data acquisitions of the same body region in series, during the injection of intravenous contrast material.

The number of CT data acquisitons is denoted herein by n. Often, the square of image noise is proportional to 1/mAs. Since the applied dose in mAs is known in many applications, normalization can be applied by using the estimate of the noise based on the instantaneous dose. The sampling point, i, for i=1, . . . , n, may correspond to a time point of an image acquisition. The tube load of the X-ray tube at time point i is denoted by $mAs_i$. $I(x, i)$ represents the CT number of a voxel at location x and time point i. $I_i(x)$ denotes the signal vector at location x for all the time points, excluding the timpe point i. $\|I_i(x), I_i(y)\|$ is the normalized distance measure between signal vectors $I_i(x)$ and $I_i(y)$. For example, $$\|I_i(x), I_i(y)\| = \sum_{j=1; j \neq i}^{n} [I_j(y) - I_j(x)]^2 \cdot mAs_j$$

I*(x, i) is a noise-reduced CT number of a voxel at location x and time point i. For example, $$I^*(x, i) = \frac{1}{M} \sum_{j=1}^{M} I(y_j, i).$$

Herein, $y_j$ for j=1, M are the voxels that satisfy the applicable criterion (e.g., $\|I_i(x), I_i(y_j)\|$ is smallest (or 'small enough')), and M is a selectable parameter representing the number of voxels that are averaged to compute the filtered output value. This parameter can be regarded intuitively as a 'virtual factor of dose increase'. In certain embodiments, the value of M may typically be selected between 30 and 300.

In known CTP, typically between 10 and 30 CT volume datasets are acquired after injection of contrast agent, although the number of CT volume datasets may be more or fewer. Each dataset has a relatively low acquisition dose, since the total dose given to the patient has to be divided over the CT volume datasets. Each of these 10-30 datasets typically consists of 32-320 thin sections (0.5-1 mm), although other numbers of sections and section thickness are possible. Data may be spatially registered before processing with the above-described filter, to compensate for motion of e.g. the subject that is imaged. The time-dependence of the contrast enhancement of brain tissue is typically used to calculate various perfusion parameters. For the example of CTP of the brain, cerebral blood flow (CBF), cerebral blood volume (CBV) and mean transit time (MTT) are usually calculated and used to distinguish normal, hypoperfused and infarcted tissue in patients with suspected stroke Unfiltered thin-section data may suffer from very high image noise, due to the low dose acquisition of each CT volume datasets. Because 10-30 datasets are acquired, the total acquisition dose is still higher than that of standard CT. When computing CBF, CBV and MTT images, this noise leads to inaccurate results. Therefore image noise needs to be reduced before computing CBF, CBV and MTT images. The noise may be reduced by increasing the thickness of perfusion images to 5-10 mm and additional (usually smoothing) in-plane filtering. These noise-reducing techniques cause so-called partial volume effects and blurring, which create problems with small abnormalities (e.g., lacunar infarcts) and artifacts due to vessels that are smaller in diameter than the section thickness.

After filtering the CT data using the proposed similarity filter of the present disclosure, excellent image quality with low noise and high spatial and contrast resolution can be obtained, even for 1 mm-sections, at the radiation dose levels that have been used in the past for CTP. A high-quality dynamic 4D-CT angiography can be reconstructed from these filtered data. CTP images (CBF, CBV and MTT) showing a high resolution and low image noise can be created. These can make it possible to detect small abnormalities, even on 1 mm sections.

The improved filter may help to substantially improve diagnostic accuracy, and allow smaller infarcts to be assessed. Other, new applications may also be made possible by the method. Alternatively, radiation dose may be reduced will be possible without losing diagnostic accuracy. By enabling CTP with excellent quality at standard dose levels, the major current obstacle to introducing CTP into clinical practice may be taken away. One might even envision that CTP becomes the main scanning mode that will be used for the vast majority of patients having certain clinical conditions.

The similarity filter can be applied to any CT technique in which multiple 3D (or 2D) data are acquired over time and CT attenuation varies across these acquisitions. In certain embodiments, data need to be spatially registered to make sure the same volume element (voxel) always encodes the identical tissue.

In ventilation imaging, multiple CT volumes can be acquired during the breathing cycle in order to detect local variations in lung ventilation or to analyze lung motion. This is expected to have diagnostic use for assessment of local air trapping, bronchial collapse, or assessment of whether a tumor is fixed to the mediastinum or chest wall.

In certain embodiments, the various volumes are registered to each other without density correction, after which the similarity filter is applied to reduce noise. This makes it possible to analyze the dynamic density changes during the breathing cycle. By inversely applying the deformation field obtained from the registration process, the motion can be visualized at high image quality.

Combined CTP and motion assessment is also possible. A CTP acquisition in an area that is subject to motion during the acquisition can be used to not only analyze perfusion but also the motion. This can, for example, be useful in patients planned for radiation therapy in order to understand the motion of the target organ, and at the same time, to analyze the perfusion of the tumor that is to be irradiated. In certain embodiments, the various volumes are registered to each other with density correction of the lungs. This means that changes in lung density due to compression and expansion of lung tissue are compensated for. The similarity filter is thereafter used to reduce noise. This makes it possible to analyze the dynamic density changes for CTP. By inversely applying the deformation field from the registration process, also the motion can be visualized at high image quality.

Raw-data based analysis is also possible. The technique disclosed above may be applied to already reconstructed 3D data in image space. However, the same technique can also be used to filter the raw data (i.e., the detector reading) before image reconstruction. This has the advantage that advanced new iterative reconstruction algorithms can take advantage of noise reduction obtained by the similarity filter, to further improve image quality or reduce radiation dose requirements. In certain embodiments, the following steps are taken to do so. First, 3D volumes are reconstructed from the raw data. Thereafter, theses volumes are spatially registered to compensate for motion. Next, the motion-corrected data are back-projected to create a motion-corrected raw data set. Additional corrections may optionally be applied to compensate for technical details of specific scanners. The resulting raw data set is filtered using the similarity filter. Herein, the gantry angle and the position of the sensor on the gantry may represent the position vector x, and successive detections for each position x may form the sampling points i. The filtered raw data can thereafter be reconstructed using any suitable computed tomographic reconstruction technique, including iterative reconstruction or back-projection.

Magnetic Resonance Imaging (MM) data can also be improved using the similarity filter. In MRI, increasing spatial resolution requires a longer acquisition duration or causes substantially higher image noise. To avoid too long scanner time, high-resolution acquisitions are usually avoided in situations where a time sequence of multiple volumes is to be reconstructed. The similarity filter can be used to either increase spatial resolution or reduce scan duration, or a combination thereof. Again, in certain embodiments, spatial registration of the sequence of volume datasets is performed before the similarity filter is applied.

Dynamic Contrast-enhanced Magnetic Resonance Imaging (DCE-MRI) is based on similar principles as CTP: 3D data is acquired multiple times, one after the other, during injection of contrast material, so that the flow of the contrast agent can be studied. The similarity filter can be used on dynamic contrast-enhanced MRI in several different ways. In certain embodiments, the similarity filter is used without change of acquisition protocols, in a similar way as with CTP. That is, the successive volumetric MRI datasets may be filtered using the techniques disclosed hereinabove. This will increase image quality by reducing the noise, but will not increase spatial resolution or reduce acquisition time, since the latter two parameters are not changed. In some embodiments, the acquisition time per 3D data set is shortened compared to existing DCE-MRI data acquisition protocols. This way the temporal resolution and/or spatial resolution may be increased, which may help to better analyze the arterial inflow of contrast. In certain embodiments, the matrix size is increased, with or without increasing the acquisition time. This will increase spatial resolution.

Diffusion-weighted imaging (DWI) is based on multiple MR acquisitions with a varying acquisition parameter (b-value). This b-value represents the degree of diffusion weighting applied. The similarity filter can be used in a similar fashion as for DCE-MRI, with b as a parameter instead of time. Again, the choice is between higher image quality, faster acquisitions, or higher spatial resolution. The similarity filter may improve one or more or all of these factors (image quality, speed of acquisition, and spatial resolution), depending on user choice.

Arterial spin labeling (ASL) is a technique that creates noisy, time-resolved MRI data that reflect perfusion. The similarity filter can be applied to such data, in a way similar to the approach for CTP or DCE-MRI.

Dynamic examinations are rarely performed in nuclear medicine because of high image noise and insufficient image quality. The similarity filter can be used to regain image quality in dynamic scintigraphy, a 2D technique, in which multiple projections images after injection of a tracer are acquired, demonstrating perfusion and tracer uptake into the target region.

Dynamic single-photon emission computed tomography (SPECT) has not yet been (sufficiently) developed because of long acquisition times. In certain embodiments, the following steps can be taken to apply the similarity filter to SPECT: The detector ring is moved in a fast rotation mode (in principle as fast as possible, which is usually more than 10 seconds per round) around the patient. Data from each (half) rotation is used to create a 3D data set (that will normally suffer from severe noise). By reconstructing these data for the (half) rotations made during a particular time, e.g. the full regular time used for the acquisition of a SPECT, a time-resolved 4D dataset is created that comprises multiple 3D acquisitions reconstructed at various time points.

To improve the quality, data can optionally (in addition) be gated for breathing and heart pulsation to compensate for motion and allow for motion correction.

The similarity filter can then provide an image quality that approaches the image quality of a standard SPECT exam, but in contrast to a standard SPECT exam, for each dynamic phase a separate volumetric image is obtained.

In positron emission tomography (PET), noise can occur because of random coincidences or scatter. The filter might be used to achieve, for example, PET outlier reduction, in the following way. First, the total acquisition time is divided into m bins that are reconstructed separately. Using the similarity filter on these m datasets as sampling points i would eliminate data inconsistencies (scatter, random coincidences). Afterwards the datasets acquired with each of the m bins can be again combined to yield a final, corrected image. As is the case with computed tomography, the filtering technique may also be applied to the sensor data (sinograms), using the sensor position as the location x and the bin as the sampling point i.

Some or all aspects of the invention may be suitable for being implemented in form of software, in particular a computer program product. Such computer program product may comprise a storage media, such as a memory, on which the software is stored. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A system for filtering an input image dataset in order to reduce image noise, wherein the input dataset comprises
   a plurality of sequences of input signal values of an input signal generated by an imaging device, wherein each sequence of input signal values is associated with an attribute of a set of attributes, wherein the attribute is a location or a frequency, and wherein each input signal value within a sequence is associated with a sampling point representing an index of the sequence, the system comprising:
   at least one processor configured to control performing the following steps for an attribute to be processed and an index to be processed:
   (a) determining similarities between the sequence of input signal values, excluding the input signal value at the index to be processed, at the attribute to be processed, and the sequences of input signal values, excluding the input signal values at the index to be processed, at a plurality of other attributes within the set of attributes;
   (b) associating weights at the index to be processed and the attribute to be processed based on the similarities determined in step (a);

(c) computing a weighted sum of each signal value at the index to be processed within the plurality of other attributes, using the weights associated at the index to be processed and the attribute to be processed in step (b); and
(d) determining an output signal value for the attribute to be processed and the index to be processed based on the weighted sum computed in step (c).

2. The system of claim 1, wherein the weights are independent of a difference between the attribute to be processed and the attributes within the plurality of other attributes.

3. The system of claim 2, wherein the attribute to be processed is a location, the attributes within the plurality of other attributes are locations, and the weights are independent of a distance between the locations.

4. The system of claim 1, wherein the processor is configured to select the plurality of other attributes among the attributes within the set of attributes for which the similarity satisfies a predetermined constraint.

5. The system of claim 4, wherein the processor is configured to select the plurality of other attributes as a random selection of the attributes for which the similarity satisfies the predetermined constraint.

6. The system of claim 4, wherein the predetermined constraint does not impose a constraint on the difference between the attribute to be processed and the plurality of other attributes.

7. The system of claim 1, wherein the sampling points correspond to time points or wherein the sampling points represent a sequence of measurements.

8. The system of claim 1, wherein the locations represent voxel locations within a volume dataset or pixel locations within a picture dataset.

9. The system of claim 1, wherein the locations represent positions on a detector mounted on a gantry and gantry positions.

10. The system of claim 1, wherein the processor is configured to perform motion compensation on the input dataset, and to compute the output signal values based on motion compensated input signal values.

11. The system of claim 1, wherein the input signal values comprise at least one of: computed tomography (CT) data, computed tomography perfusion (CTP) data, magnetic resonance imaging (MRI) data, single photon emission computed tomography (SPECT) data, and positron emission tomography (PET) data.

12. The system of claim 1, further comprising a display configured to display an image based on the output dataset.

13. The system of claim 1, further comprising a medical imaging apparatus comprising at least one sensor to generate the input dataset.

14. A method of filtering an input image dataset in order to reduce image noise, wherein the input dataset comprises a plurality of sequences of input signal values of an input signal generated by an imaging device, wherein each sequence of input signal values is associated with an attribute of a set of attributes, wherein the attribute is a location or a frequency, and wherein each input signal value within a sequence is associated with a sampling point representing an index of the sequence, the method comprising the following steps for an attribute to be processed and an index to be processed:
(a) determining similarities between the sequence of input signal values, excluding the input signal value at the index to be processed, at the attribute to be processed, and the sequences of input signal values, excluding the input signal values at the index to be processed, at a plurality of other attributes within the set of attributes;
(b) associating weights at the index to be processed and the attribute to be processed based on the similarities determined in step (a);
(c) computing a weighted sum of each signal value at the index to be processed within the plurality of other attributes, using the weights associated at the index to be processed and the attribute to be processed in step (b); and
(d) determining an output signal value for the attribute to be processed and the index to be processed based on the weighted sum computed in step (c).

15. A system for filtering a CT perfusion dataset in order to reduce image noise, wherein the dataset comprises a series of 3D computed tomographic images acquired at various time points after injecting a patient with intravenous contrast agent, wherein each location within the 3D dataset is associated with a time sequence of CT numbers, and wherein each CT number within a sequence is associated with the time point at which the dataset was acquired,
the system comprising at least one processor configured to control performing the following steps for a location to be processed and a time point to be processed:
(a) determining similarities between the sequence of CT numbers, excluding the CT number at the time point to be processed, at the location to be processed, and the sequences of CT numbers, excluding the CT numbers at the time point to be processed, at a plurality of other locations;
(b) associating weights at the time point to be processed and the locations to be processed based on the similarities determined in step (a);
(c) computing a weighted sum of each CT number at the time point to be processed within the plurality of other locations, using the weights associated at the time point to be processed and the location to be processed in step (b); and
(d) determining an output CT number for the location to be processed and the time point to be processed based on the weighted sum computed in step (c).

* * * * *